UNITED STATES PATENT OFFICE.

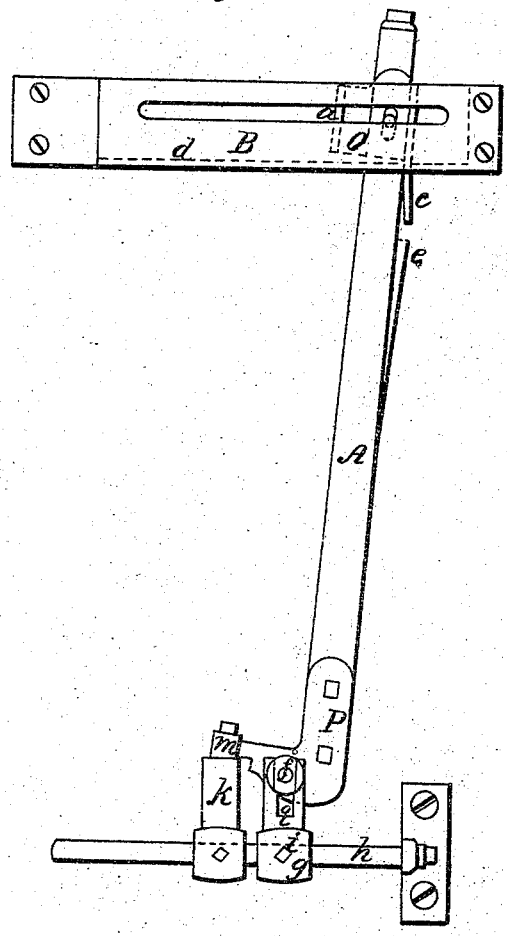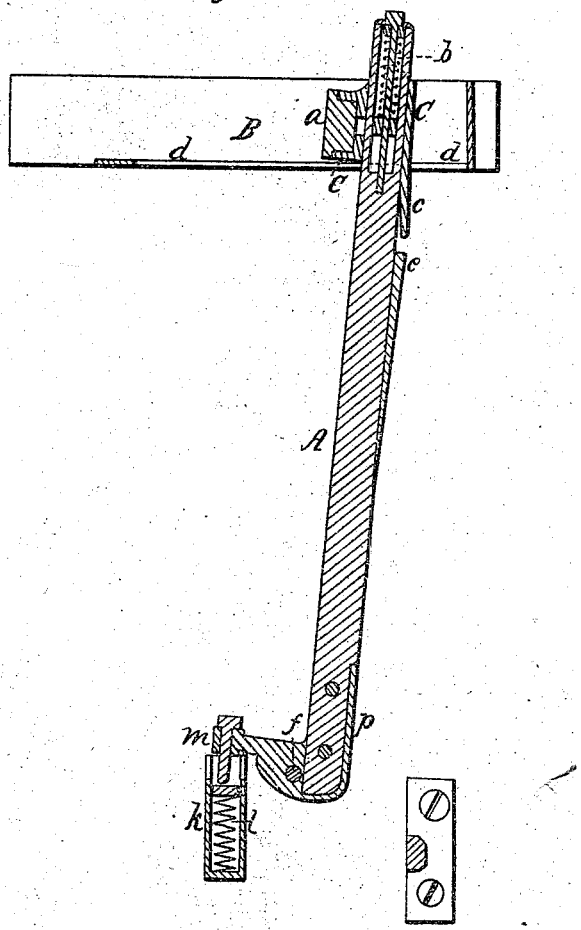

JOHN ROBINSON, OF ANDOVER, MASSACHUSETTS.

PICKER-MOTION FOR LOOMS.

Specification of Letters Patent No. 32,586, dated June 18, 1861.

*To all whom it may concern:*

Be it known that I, JOHN ROBINSON, of North Andover, in the county of Essex and State of Massachusetts, have invented an Improved Picker-Motion for Looms; and I do hereby declare the same to be fully described in the following specification and represented in the accompanying drawings, of which—

Figure, 1, is a side elevation and Fig., 2, a longitudinal section of it.

In such drawings, A denotes the picker staff, and B, the shuttle box of the lay of a loom. Within the said shuttle box and resting on its bottom is a picker carrier C, the same serving to support a cushion or picker $a$. The said carrier embraces or extends around the picker staff, and so as to be capable of sliding freely up and down thereon, there being within the picker staff a spring, $b$, so applied to such picker staff as to press the latter downward toward the bottom of the shuttle box. Furthermore, the carrier C, is constructed with an extension or tail piece $c$, which projects downward from the rear part of the carrier and through and somewhat beyond the picker staff slot, $d$, of the bottom of the shuttle box. This tail piece should be about the width of the slot $d$, in order that the tail piece may operate to steady the carrier in case of wear of the picker staff that may be occasioned by working of the carrier therein. There is also applied to the picker staff, a shoulder or stop $e$, which is arranged beneath the lower end of the tail piece or projection, $c$, and so as to serve as a rest or support for the tail piece and its carrier during the movement of the picker staff through the middle third portion of its arc of motion. While the picker staff is passing through such middle third part of the arc of its motion the carrier, C, by means of the tail piece, $c$, and the stop, $e$, will be maintained out of contact with the bottom of the shuttle box. Thus, during the middle third (or thereabout) of the movement either backward or forward of the carrier in the shuttle box, such carrier will not rub on the bottom of the latter as it would if allowed to rest thereon during such period. The tail piece, $c$, and its rest or shoulder, $e$, thereby operate to save much friction and facilitate the movement of the picker staff or effect a saving of power in operating it. The spring, $b$, and the bottom of the shuttle box serve to regulate the upward and downward movement of the carrier, C, on the picker staff while the latter is in motion, the carrier under such circumstances being caused to move in a path sufficiently straight to enable the shuttle to be driven forward in a straight line.

The foot of the picker staff is supported in a shoe $p$, which turns in a fulcrum, $f$, sustained by an adjustable slider, $g$, which slides freely on a horizontal bar or rod, $h$, and has a set screw $i$, by which it can be fixed in place on the bar. This bar is intended to project from the loom frame. There is also another adjustable slider or spring case, $k$, similarly adapted to the said bar and properly formed to hold a helical spring, $l$, on the top of which an arm or projection, $m$, from the shoe, $p$, of the picker staff rests, and bears while the picker staff may be in movement. This spring not only serves to throw or force the picker staff back to place after each throw of the shuttle but operates as a means of gradually arresting the momentum of the said staff. By means of the rod, $h$, the adjustable sliders, $g$, and, $k$, and the arm, $m$, the picker staff and its spring, $l$, may be simultaneously moved either toward or from the end of the loom frame and so as to be properly adjusted with reference to the shuttle box as circumstances may require. The fulcrum of the picker staff extends through a vertical slot, $q$, made in the slider $g$ and is provided with a set screw, $r$, by which its vertical position can be adjusted and determined.

My improvements not only effect the results above stated, but render the operations of the picker staff very effective.

I claim—

1. The above specified arrangement and application of the picker carrier C, and the spring $b$, with the picker staff and the shuttle box.

2. The combination and arrangement of the tail piece, c, and the shoulder or stop, e, with the carrier, C, the shuttle box, and the picker staff as described.

3. The combination and arrangement of the supporting rod, h, the adjustable fulcrum supporter, g, the adjustable spring case, k, and the arm, m, the whole being applied to the picker staff and its spring as specified.

JOHN ROBINSON.

Witnesses:
F. P. HALE, Jr.,
W. G. LEVI.